United States Patent
Zhang et al.

(10) Patent No.: US 11,165,487 B2
(45) Date of Patent: Nov. 2, 2021

(54) FRAME STRUCTURES FOR BEAM SWITCHING AND REFINEMENT IN CELLULAR SYSTEMS

(71) Applicant: Apple Inc., Cupertino, CA (US)

(72) Inventors: Yushu Zhang, Beijing (CN); Wenting Chang, Beijing (CN); Yuan Zhu, Beijing (CN); Gang Xiong, Portland, OR (US); Bishwarup Mondal, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/084,505

(22) PCT Filed: Jul. 1, 2016

(86) PCT No.: PCT/US2016/040886
§ 371 (c)(1),
(2) Date: Sep. 12, 2018

(87) PCT Pub. No.: WO2017/171901
PCT Pub. Date: Oct. 5, 2017

(65) Prior Publication Data
US 2019/0089446 A1     Mar. 21, 2019

(30) Foreign Application Priority Data
Mar. 29, 2016    (WO) ................ PCT/CN2016/077731

(51) Int. Cl.
*H04B 7/08*      (2006.01)
*H04L 5/00*      (2006.01)
(Continued)

(52) U.S. Cl.
CPC ........... *H04B 7/088* (2013.01); *H04B 7/2656* (2013.01); *H04L 5/0048* (2013.01);
(Continued)

(58) Field of Classification Search
CPC .... H04B 7/0617; H04B 7/088; H04B 7/0891; H04B 7/0897; H04B 7/2643;
(Continued)

(56) References Cited

U.S. PATENT DOCUMENTS

| | | |
|---|---|---|
| 2010/0164805 A1 | 7/2010 | Niu et al. |
| 2014/0016620 A1* | 1/2014 | Singh ................ H04W 56/0005 370/336 |

(Continued)

OTHER PUBLICATIONS

Alcatel-Lucent Shanghai Bell et al: "proposals for beamformed CSI-RS based 3D MIMO Transmission Scheme", 3GPP Draft; R1-153814 Proposals for Beamformed CSI-RS Based 3D-Mimo Transmission Schemes Final 3rd Generation 3artnership Project (3GPP), Mobile Competence Centre; 650 Route Des Lucioles; F-06921, vol. RAN WG1, No. Beijing, China; Aug. 24, 2015-Aug. 28, 2015, Aug. 21, 2015. URL: http://www.3gpp.org.ftp/meetings_3gpp_sync_ran1_Docs/.

(Continued)

*Primary Examiner* — Young T. Tse
(74) *Attorney, Agent, or Firm* — Eschweiler & Potashnik, LLC

(57) ABSTRACT

Technologies described herein provide mechanisms and formats to accomplish the beam switching. In one implementation, least one frame structure for both uplink (UL) and downlink (DL) beam switching is provided. The UL beam switching and refinement may rely on 5G Physical Random Access Channel (xPRACH) or 5G Sounding Reference Signal (xSRS). The DL beam switching and refinement may be done based on a beam refinement reference signal (BRRS). In some embodiments, to accomplish the both UL and DL beam switching and refinement in one subframe, the BRRS and xPRACH or xSRS may be located in one subframe.

21 Claims, 7 Drawing Sheets

(51) Int. Cl.
*H04L 25/02* (2006.01)
*H04L 27/26* (2006.01)
*H04W 74/08* (2009.01)
*H04B 7/26* (2006.01)

(52) U.S. Cl.
CPC .......... *H04L 5/0053* (2013.01); *H04L 5/0094* (2013.01); *H04L 25/0226* (2013.01); *H04L 27/2607* (2013.01); *H04L 27/2613* (2013.01); *H04W 74/0833* (2013.01)

(58) Field of Classification Search
CPC .. H04B 7/2656; H04B 7/2671; H04B 7/2682; H04B 7/2684; H04L 5/0048; H04L 5/0053; H04L 5/0092; H04L 5/0094; H04L 25/0224; H04L 25/0226; H04L 25/023; H04L 25/0236; H04L 25/2605; H04L 25/2607; H04L 25/2613; H04W 74/0833
USPC ....... 375/259, 260, 262, 265, 267, 365, 366, 375/368; 370/310, 328, 330, 334, 335, 370/337, 342, 347, 349, 350, 509–514; 455/500, 502, 70, 88
See application file for complete search history.

(56) References Cited

U.S. PATENT DOCUMENTS

| | | | |
|---|---|---|---|
| 2014/0177607 A1* | 6/2014 | Li | H04B 7/0617 370/336 |
| 2014/0185481 A1 | 7/2014 | Seol et al. | |
| 2014/0254515 A1 | 9/2014 | Kim et al. | |
| 2015/0009951 A1* | 1/2015 | Josiam | H04L 25/0224 370/330 |
| 2015/0079945 A1* | 3/2015 | Rubin | G06F 11/00 455/411 |
| 2015/0208443 A1* | 7/2015 | Jung | H04W 72/042 370/329 |
| 2015/0312864 A1 | 10/2015 | Jung | |
| 2015/0382205 A1* | 12/2015 | Lee | H04L 5/0048 370/329 |
| 2016/0080060 A1 | 3/2016 | Yu et al. | |
| 2016/0157267 A1* | 6/2016 | Frenne | H04B 7/0408 370/329 |
| 2016/0286555 A1* | 9/2016 | Papasakellariou | H04L 5/00 |
| 2016/0315674 A1* | 10/2016 | Li | H04B 7/022 |
| 2017/0033908 A1* | 2/2017 | Hwang | H04L 5/0053 |
| 2017/0181134 A1* | 6/2017 | Niu | H04B 17/318 |
| 2018/0176753 A1* | 6/2018 | Kim | H04W 72/04 |
| 2018/0212659 A1* | 7/2018 | Xiong | H04B 7/0695 |
| 2019/0007116 A1* | 1/2019 | Chang | H04L 5/005 |
| 2019/0044601 A1* | 2/2019 | Chang | H04L 5/0092 |
| 2019/0058558 A1* | 2/2019 | Lee | H04L 5/0083 |
| 2019/0059099 A1* | 2/2019 | Davydov | H04B 7/0617 |
| 2020/0067583 A1* | 2/2020 | Shin | H04B 7/0486 |
| 2020/0404635 A1* | 12/2020 | Bendlin | H04W 72/042 |

OTHER PUBLICATIONS

Verizon: "TS V5G.213 v1.0 Verizon 5G TF; Air Interface Working Group; Verizon 5th Generation Radio Access; Physical layer procedures (Release 1)",Jun. 1, 2016 (Jun. 1, 2016), pp. 1-43, XP055317019, URL:http://www.5gtf.org/V5G 213 vlp0.pdf.
International Search Report for International Application PCT/US2016/040886, dated Oct. 5, 2017, 4 pages.

* cited by examiner

RECEIVING OR CAUSING TO RECEIVE A BEAM REFINEMENT REFERENCE SIGNAL (BRRS) SUBFRAME THAT INCLUDES AT LEAST ONE XPRACH SYMBOL OR AT LEAST ONE XSRS SYMBOL
802

IDENTIFYING OR CAUSING TO IDENTIFY THE XPRACH SYMBOL OR THE XSRS SYMBOL WITHIN THE BRRS SUBFRAME
804

REFINING OR CAUSING TO REFINE A UL RX BEAM BASED ON THE AT LEAST ONE XPRACH SYMBOL OR THE AT LEAST ONE XSRS SYMBOL
806

┌─────────────────────────────────────┐
│ RECEIVING OR CAUSING TO RECEIVE A BRRS │
│   SUBFRAME THAT INCLUDES AT LEAST ONE  │
│              BRRS SYMBOL               │
│                 902                    │
└─────────────────────────────────────┘
                   │
                   ▼
┌─────────────────────────────────────┐
│  IDENTIFYING OR CAUSING TO IDENTIFY THE │
│ AT LEAST ONE BRRS SYMBOL WITHIN THE BRRS │
│              SUBFRAME                  │
│                 904                    │
└─────────────────────────────────────┘
                   │
                   ▼
┌─────────────────────────────────────┐
│  SWITCHING OR CAUSING TO SWITCH A DL TX │
│   BEAM BASED ON THE AT LEAST ONE BRRS  │
│              SYMBOL                    │
│                 906                    │
└─────────────────────────────────────┘
```

FRAME STRUCTURES FOR BEAM SWITCHING AND REFINEMENT IN CELLULAR SYSTEMS

CROSS-REFERENCE TO RELATED CASE APPLICATIONS

This application is a national phase application claiming the benefit of and priority to International Patent Application No. PCT/US2016/040886, filed Jul. 1, 2016, which claims priority to International Patent Application Number PCT/CN2016/077731, filed Mar. 26, 2016, both of which are hereby incorporated by reference.

TECHNICAL FIELD

Embodiments herein generally relate to transmit (Tx) and receive (Rx) beam switching and refinement in network systems. In particular, the present disclosure relates to Tx and Rx beam switching and refinement in 3rd Generation Partnership Project (3GPP) and 5G network systems.

BACKGROUND

Wireless mobile communication technology uses various standards and protocols to transmit data between a node (e.g., a transmission station) and a wireless device (e.g., a mobile device). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node in an Evolved Universal Terrestrial Radio Access Network (E-UTRAN) system is referred to as an eNode B (also commonly denoted as evolved Node Bs, enhanced Node Bs, eNodeBs, or eNBs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

In a massive multiple-input multiple-putput (MIMO) system, a DL signal may be transmitted using transmitting (Tx) beamforming and received using receiving (Rx) beamforming. Additionally, a UL signal may be transmitted using Tx beamforming and received using Rx beamforming. As a result of user equipment (UE) rotation, movement, and Doppler frequency shift, the Tx beam, from a node (e.g., eNB), that is preferable at a given time may change (e.g., from one Tx beam to another Tx beam). In addition, an Rx beam, at the UE, that is preferable may also change (e.g., from one Rx beam to another Rx beam). Furthermore, as a result of UE rotation, movement, and Doppler frequency shift, a Tx beam, from the UE, that is preferable at a given time may change (e.g., from one Tx beam to another Tx beam). Still further, as a result of UE rotation, movement, and Doppler frequency shift, an Rx beam, at the node, that is preferable at a given time may change (e.g., from one Rx beam to another Rx beam).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 8 illustrates a first exemplary process.

FIG. 9 illustrates a second exemplary process.

Figure 1:
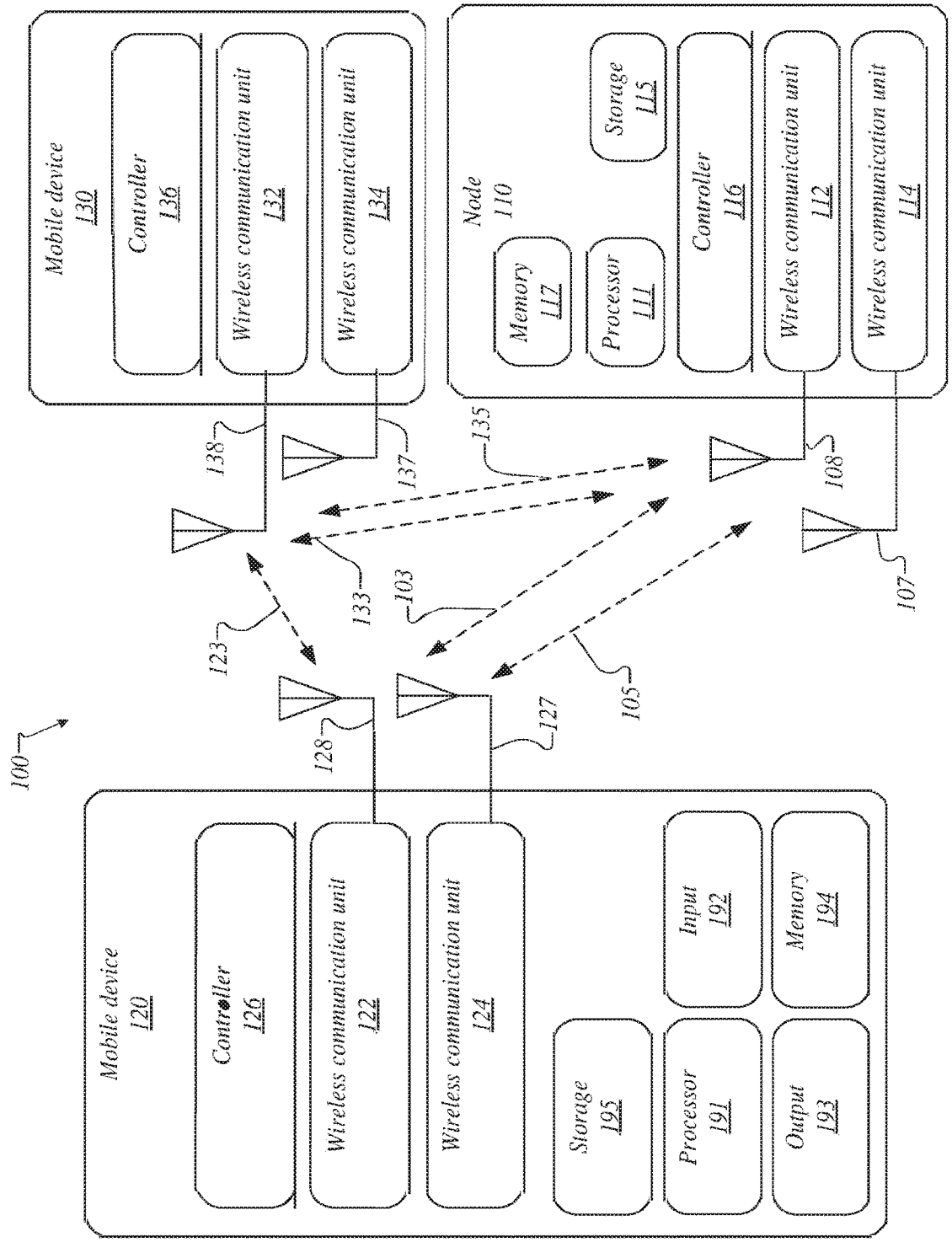
FIG. 1 schematically illustrates a block diagram of a system, in accordance with some exemplary embodiments.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

Various embodiments disclosed herein may relate to long term evolution-advanced (LTEa) and/or fifth generation (5G) system information (SI). A massive multiple input and multiple output (MIMO) may be applied in the 5G system to enhance the coverage and improve the spectrum efficiency. In the massive MIMO system, an eNodeB (eNB) may maintain a plurality of transmitting (Tx) and receiving (Rx) beams. Meanwhile the user equipment (UE) may also maintain a plurality of Tx and Rx beams. Then after initial communication with an eNB, a UE may be able to find out the best downlink (DL) Tx-Rx beam pair. For uplink (UL), the eNB may find the best UL Rx beam by beam scanning based on extended (e.g., 5G) physical random access channel (xPRACH) or extended (e.g., 5G) sounding reference signal (xSRS).

As a result of UE movement, the optimum Tx-Rx beam pair for both UL and DL may change. A beam refinement reference signal (BRRS) may be utilized to switch the DL Tx beam and refine the DL Rx beam. The UL Tx beam may be similar or the same as DL Rx beam. The UL Rx beam may be trained or refined by xPRACH and xSRS. To accomplish the beam switching, at least one frame structure for both UL and DL beam switching is provided. The UL beam switching and refinement may rely on the xPRACH or xSRS. The DL beam switching and refinement may be done based on the BRRS. Hence, in some embodiments, to accomplish the both UL and DL beam switching and refinement in one subframe, the BRRS and xPRACH or xSRS may be located in one subframe.

Reference is now made to FIG. 1, which schematically illustrates a block diagram of a communication system 100, in accordance with some exemplary embodiments. As shown in FIG. 1, in some exemplary embodiments, communication system 100 may include one or more wireless communication devices capable of communicating content, data, information and/or signals via a wireless medium. For example, communication system 100 may include one or more wireless communication nodes, e.g., node 110, and one or more mobile devices, e.g., including mobile devices 120 and 130. The wireless medium may include, for example, a radio channel, a cellular channel, an RF channel, a Wireless Fidelity (WiFi) channel, an IR channel, and the like. One or more elements of communication system 100 may optionally be capable of communicating over any suitable wired communication links.

In some exemplary embodiments, node 110, mobile device 120 and/or mobile device 130 may be configured to communicate over one or more wireless communication frequency bands. For example, node 110, mobile device 120 and/or mobile device 130 may communicate over a first frequency band and over a second frequency band, e.g., higher than the first frequency band. In some exemplary embodiments, node 110 may include or may perform the functionality of a Base Station (BS), an Access Point (AP), a WiFi node, a Wimax node, a cellular node, e.g., an eNB, a station, a hot spot, a network controller, and the like. In some exemplary embodiments, mobile devices 120 and/or 130 may include, for example, a UE, a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a portable device, a mobile phone, a cellular telephone, a PCS device, a mobile or portable GPS device, a DVB device, a relatively small computing device, a non-desktop computer, an Ultra Mobile Device (UMD), an Ultra Mobile PC (UMPC), a Mobile Internet Device (MID), a video device, an audio device, an A/V device, a gaming device, a media player, a Smartphone, or the like.

In some exemplary embodiments, node 110, mobile device 120 and/or mobile device 130 may include one or more wireless communication units to perform wireless communication over the one or more wireless communication frequency bands between node 110, mobile device 120 and/or mobile device 130 and/or with one or more other wireless communication devices. For example, node 110 may include a first wireless communication unit 112 configured to communicate over the first frequency band, and a second wireless communication unit 114 configured to communicate over the second frequency band; mobile device 120 may include a first wireless communication unit 122 configured to communicate over the first frequency band, and a second wireless communication unit 124 configured to communicate over the second frequency band; and/or mobile device 130 may include a first wireless communication unit 132 configured to communicate over the first frequency band, and a second wireless communication unit 134 configured to communicate over the second frequency band.

In some exemplary embodiments, wireless communication units 112, 114, 122, 124, 132 and 134 may include, or may be associated with, one or more antennas. In one example, wireless communicate unit 112 may be associated with one or more antennas 108; wireless communication unit 114 may be associated with one or more antennas 107; wireless communication unit 122 may be associated with one or more antennas 128; wireless communication unit 124 may be associated with one or more antennas 127; wireless communication unit 132 may be associated with one or more antennas 138; and/or wireless communication unit 134 may be associated with one or more antennas 137.

Antennas 108, 107, 128, 127, 138 and/or 137 may include any type of antennas suitable for transmitting and/or receiving wireless communication signals, blocks, frames, transmission streams, packets, messages and/or data. For example, antennas 108, 107, 128, 127, 138 and/or 137 may include any suitable configuration, structure and/or arrangement of one or more antenna elements, components, units, assemblies and/or arrays. Antennas 108, 107, 128, 127, 138 and/or 137 may include, for example, antennas suitable for directional communication, e.g., using beamforming techniques. For example, antennas 108, 107, 128, 127, 138 and/or 137 may include a phased array antenna, a multiple element antenna, a set of switched beam antennas, and/or the like. In some embodiments, antennas 108, 107, 128, 127, 138 and/or 137 may implement transmit and receive functionalities using separate transmit and receive antenna elements. In some embodiments, antennas 108, 107, 128, 127, 138 and/or 137 may implement transmit and receive functionalities using common and/or integrated transmit/receive elements.

In some exemplary embodiments, mobile devices 120 and/or 130 may also include, for example, a processor 191, an input unit 192, an output unit 193, a memory unit 194, and a storage unit 195; and/or node 101 may also include, for example, one or more of a processor 111, a memory unit 117, and a storage unit 115. Node 101, mobile device 120 and/or mobile device 130 may optionally include other suitable hardware components and/or software components. In some exemplary embodiments, some or all of the components of node 101, mobile device 120 and/or mobile device 130 may be enclosed in a common housing or packaging, and may be interconnected or operably associated using one or more wired or wireless links. In other embodiments, components of node 101 may be distributed among multiple or separate devices. Processor 111 and/or processor 191 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 111 executes instructions, for example, of an Operating System (OS) of node 110 and/or of one or more suitable applications. Memory unit 117 and/or memory unit 194 include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 and/or storage unit 195 include, for example, a hard disk drive, a floppy disk drive, a Compact Disk (CD) drive, a CD-ROM drive, a DVD drive, or other suitable removable or non-removable storage units. For example, memory unit 117 and/or storage unit 115, for example, may store data processed by node 101.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices. In some exemplary embodiments, mobile device 120 and node 110 may establish a wireless communication link 105 for communication between mobile device 120 and node 110 over a frequency band. For example, mobile device 120 and node 110 may establish link 105, e.g., upon entering of mobile device 120 into a cell controlled by node 110.

In some exemplary embodiments, mobile device 130 and node 110 may establish a wireless communication link 135 for communication between mobile device 130 and node 110 over a frequency band. For example, mobile device 130 and node 110 may establish link 135, e.g., upon entering of mobile device 130 into a cell controlled by node 110.

In some exemplary embodiments, node 110 may include a wireless communication controller 116 configured to control wireless communication unit 114 to communicate information over a frequency band, e.g., via antennas 107. In some exemplary embodiments, mobile device 120 may include a wireless communication controller 126 configured to control wireless communication unit 124 to communicate information over a frequency band, e.g., via antennas 127. In some exemplary embodiments, controller 116 may control wireless communication unit 114 to communicate information between node 110 and mobile device 120, and to establish a link 103 between node 110 and mobile device 120. In some exemplary embodiments, controller 126 may control wireless communication unit 124 to communicate information between mobile device 120 and node 110, and to establish link 103 between node 110 and mobile device 120.

In some exemplary embodiments, mobile device 130 may include a wireless communication controller 136 configured to control wireless communication unit 134 to communicate information over a frequency band, e.g., via antennas 137. In some exemplary embodiments, controller 136 may control wireless communication unit 134 to communicate information between mobile device 130 and node 110, and to establish a link 133 between node 110 and mobile device 130. In some exemplary embodiments, controller 116 may control wireless communication unit 114 to communicate information between node 110 and mobile device 130, and to establish link 133 between node 110 and mobile device 130.

In some exemplary embodiments, controller 116 may control wireless communication unit 114 to communicate information between node 110 and mobile devices 120 and 130; and to control mobile devices 120 and 130 to establish a link 123 between mobile device 120 and mobile device 130.

In some exemplary embodiments, links 103, 123 and/or 133 may include a direct link, e.g., a P2P link, for example, to enable direct communication between node 110, mobile device 120 and/or mobile device 130. In some exemplary embodiments, links 103, 123 and/or 133 may include a wireless beamformed link.

In one example, the information communicated between node 110 and mobile device 120 may include information with respect to node 110, e.g., supported transmission power levels of node 110, one or more modulation orders of node 110, a number of antennas of antennas 108, a number of antenna elements per antenna of antennas 108, and/or a beamforming capability of wireless communication unit 112; and/or capability information with respect to mobile device 120, e.g., wireless communication unit 122, supported transmission power levels of device 120, one or more modulation orders of device 120, a number of antennas of antennas 128, a number of antenna elements per antenna of antennas 128, and/or a beamforming capability of wireless communication unit 122.

In another example, the information communicated between node 110 and mobile device 120, e.g., via link 105, and/or between node 110 and mobile device 130, e.g., via link 135, to establish link 123, may include information with respect to mobile device 120; and/or information with respect to mobile device 130, e.g., whether device 130 includes e.g., wireless communication unit 132, supported transmission power levels of device 130, one or more modulation orders of device 130, a number of antennas of antennas 138, a number of antenna elements per antenna of antennas 138, and/or a beamforming capability of wireless communication unit 132.

In some exemplary embodiments, the information with respect to a device may include location information corresponding to a location of the device. In one example, the information communicated between node 110 and mobile device 120 may include location information corresponding to a location of node 110, e.g., a location Fix of node 110; and/or location information corresponding to a location of mobile device 120, e.g., a location Fix of mobile device 120. In one example, the information communicated between node 110 and mobile device 120 may include location information corresponding to a location of node 110, e.g., a location Fix of node 110; and/or location information corresponding to a location of mobile device 120, e.g., a location Fix of mobile device 120. In another example, the information communicated between node 110 and mobile device 120, and between node 110 and mobile device 130, e.g., before establishing link 123, may include location information corresponding to a location of device 120, e.g., a location Fix of device 120; and/or location information corresponding to a location of mobile device 130, e.g., a location Fix of mobile device 130.

In one example, node 110 and mobile device 120 may communicate, e.g., before establishing link 103, e.g., via link 105, information including the transmission power levels of node 110 and/or device 120; the modulation orders of node 110 and/or device 120; the number of antennas of antennas 108 and/or 208; the number of antenna elements per antenna of antennas 108 and/or 208; the beamforming capability of wireless communication units 112 and/or 122; and/or the location information corresponding to the location of mobile device 120 and/or node 110.

In some exemplary embodiments, node 110 and/or mobile device 120 may utilize the information corresponding to node 110 and/or device 120 to configure preliminary beamforming settings of antennas 108 and/or 128 for performing the beamforming training between mobile device 120 and node 110.

In some exemplary embodiments, node 110 and/or mobile device 120 may utilize the location information corresponding to node 110 and/or mobile device 120 and an orientation of mobile device 120 to configure the preliminary beamforming settings of antennas 108 and/or 128.

In some exemplary embodiments, node 110 and/or mobile device 120 may configure the preliminary beamforming settings of antennas 108 and/or 128, such that antennas 108 and 128 may form a directional beam at an estimated direction towards each other.

In one example, controller 116 may estimate a relative location of mobile device 120 with respect to node 110, e.g., based on the location information corresponding to device 120. Controller 116 may configure the beamforming settings of antennas 108 to initiate the beamforming training in a direction directed to the estimated location of mobile device 120. In some exemplary embodiments, controller 126 may estimate a relative location of node 110 with respect to mobile device 120, e.g., based on the location information corresponding to node 110.

In some exemplary embodiments, controller 126 may estimate an orientation of antennas 128 of mobile device 120, e.g., utilizing a compass of mobile device 120, a gyroscope of mobile device 120, and/or any other devices and or methods of estimating the orientation of antennas 128. Controller 126 may configure the beamforming settings of antennas 128 to initiate the beamforming training in a direction directed to the relative location of node 110 based on the relative location of node 110 and the orientation of antennas 128 of device 120.

In some exemplary embodiments, mobile device 130 and/or mobile device 120 may utilize the information corresponding to mobile devices 120 and 130 to configure preliminary beamforming settings of antennas 128 and/or 138 for performing beamforming training between mobile devices 120 and 130.

In some exemplary embodiments, mobile device 130 and/or mobile device 120 may configure the preliminary beam forming settings of antennas 138 and/or 128, such that antennas 138 and 128 may form a directional beam towards each other.

In some exemplary embodiments, controller 126 may estimate a relative location of mobile device 130 with respect to mobile device 120, e.g., based on the location information corresponding to mobile device 130.

In some exemplary embodiments, controller 126 may estimate an orientation of antennas 128 of mobile device 120. Controller 126 may configure the beamforming settings of antennas 128 to initiate the beamforming training in a direction directed to the relative location of node 110 based on the relative location of node 110 and the orientation of device 120 and/or a relative direction of link 105.

In some exemplary embodiments, controller 136 may estimate the relative location of mobile device 120 with respect to mobile device 130, e.g., based on the location information corresponding to mobile device 120.

In some exemplary embodiments, controller 136 may estimate an orientation of antennas 138 of mobile device 130, e.g., based on a compass of mobile device 130, a gyroscope of mobile device 130, and/or any other devices and or methods of estimating the orientation of antennas 138. Controller 136 may configure the beamforming settings of antennas 138 to initiate the beamforming training in a direction directed to the relative location of node 110 based on the relative location of node 110 and the orientation of device 120 and/or based on a relative direction of link 135.

In some exemplary embodiments, node 110, mobile device 120 and/or mobile device 130 may utilize links 105 and/or 135 for communicating information corresponding to the beamforming training between node 110, mobile device 120 and/or mobile device 130.

In one example, node 110, mobile device 120 and/or mobile device 130 may utilize links 105 and/or 135 for performing the beamforming training, for example, after configuring the preliminary beamforming settings of antennas 108, 128 and/or 138.

In some exemplary embodiments, controller 116 may control wireless communication unit 112 to use the Tx beamforming setting for transmitting to device 130 over link 133. For example, controller 116 may adjust beamforming settings of antennas 108 according to the Tx beamforming settings to transmit to device 130 over link 133.

In some exemplary embodiments, controller 126 may control wireless communication unit 122 to use the Tx beamforming setting for transmitting to node 110 over link 103. For example, controller 126 may adjust beamforming settings of antennas 128 according to the Tx beamforming setting to transmit to node 110 over link 103.

In some exemplary embodiments, controller 116 may control wireless communication unit 114 to transmit to mobile device 120 via link 105 an instruction to transmit the beamforming training signals to mobile device 130 according to the plurality of different TX beamforming settings of antennas 128. In some exemplary embodiments, controller 116 may control wireless communication unit 114 to transmit to mobile device 130 via link 135 an instruction to receive the beamforming training signals transmitted by device 120. In some exemplary embodiments, controller 116 may control wireless communication unit 114 to transmit to mobile device 120 via link 105 an instruction to use the Tx beamforming setting of antennas 128 received from mobile device 130, for transmitting to device 130 over link 123.

In some exemplary embodiments, controller 126 may control wireless communication unit 122 to use the Tx beamforming setting of antennas 128 received from mobile device 130. For example, controller 126 may adjust beamforming settings of antennas 128 according to the Tx beamforming settings to transmit to device 130 over link 123.

In some exemplary embodiments, control information corresponding to links 103, 123 and/or 133, e.g., a link adaptation, error control, beamforming adjustments, signal quality feedback and/or the like may be communicated via links 103, 123 and/or 133.

Some exemplary embodiments, e.g., the communication system 100, may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced (LTEa), Enhanced Data rates for GSM Evolution (EDGE), or the like. Other embodiments may be used in various other devices, systems and/or networks.

The communication system 100 and various exemplary embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the UE that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

Furthermore, the communication system 100 and various exemplary embodiments may additionally include logical transport channels that are classified DL and UL. The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

The DL physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The UL physical channels may include at least one of a physical random access channel (PRACH) and/or xPRACH, a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

One or more embodiments may use a communication frame structure or subframe that includes one or more of the above-indicated DL physical channels and/or UL physical channels. Moreover, the communication frame structure or subframe may include additional parameters. Such parameters may include an xSRS, a BRRS, a guard period (GP), and the like.

The xSRS is used for the node (e.g., eNB) to estimate UL channel/beam quality. In one example, xSRS may be sent in the last of OFDM symbol of the subframe. The subframes that may carry the xSRS may be specified in a downlink broadcast message.

In order to achieve faster Rx beam refinement to improve a match of Tx and Rx beams according to the channel in a timely manner, the BRRS can be used. The BRRS can be inserted before a data channel such as a PDSCH or PUSCH. In this way, a receiver can refine an Rx beam based on the BRRS before data reception. In addition, an eNB or a UE can gradually update a Tx or Rx beam to support intra Transmission Point (TP) beam mobility.

In an OFDM system, the signal subcarrier spacing is inversely proportional to the signal time duration. The subcarrier spacing of the BRRS can be larger than that of the following data OFDM symbols (e.g., PDSCH or PUCCH) by a predefined factor so that the total length of the BRRS in the time domain is reduced by the predefined factor. This reduction in the total length or duration of the BRRS enables more Rx beam candidates to be scanned during the limited time period.

Various BRRS transmission formats are contemplated. In one example, a BRRS signal structure with a subcarrier spacing that is four times the sub-carrier spacing of the data OFDM symbols can be used (i.e., the predefined factor is 4). Four BRRS OFDM symbols can be used for the BRRS. One Tx beam can be applied to the four BRRS OFDM symbols. In another example, the BRRS signal structures can have a subcarrier spacing that is four times the sub-carrier spacing of the data OFDM symbols can be used (i.e., the predefined factor is 4). Eight BRRS OFDM symbols can be used for the BRRS. The eNB may use a first Tx beam for the first four OFDM symbols (of the eight BRRS OFDM symbols) and a second Tx beam for the second four OFDM symbols (of the eight BRRS OFDM symbols). The UE can refine the first Rx beam based on the first four OFDM symbols and the second Rx beam based on the second four 01-DM symbols. In another example, the BRRS signal structures can have a subcarrier spacing that is four times the sub-carrier spacing of the data OFDM symbols can be used (i.e., the predefined factor is 4). Eight BRRS OFDM symbols can be used for the BRRS. One Tx beam can be applied to the eight BRRS OFDM symbols.

A BRRS enabling/triggering field (e.g., using 1 or 2 bits) can be included in related downlink control information (DCI). A UE can start receiving the data samples (e.g., extended (e.g., 5G) PDSCH (xPDSCH) or extended (e.g., 5G) PUSCH (xPUSCH)) following an extended physical downlink control channel (xPDCCH) using the same reception beam that was used to receive the xPDCCH. At the same time, the UE can also attempt to decode the DCI. If a BRRS enabling/triggering field in the DCI indicates to the UE that there is a BRRS followed by data OFDM symbols, the UE can start Rx beam refinement using those BRRS symbols and the resulting refined Rx beam can be used to receive the data OFDM symbols. Otherwise, the UE can simply use the most current Rx beam to receive the data OFDM symbols. In one example, if the enabling of the BRRS is configured by the DCI of a previous subframe or upper layer signaling, the BRRS may be transmitted before a control channel (e.g., xPDCCH) and the UE can use the current Rx beam to receive control channel.

Figure 2:
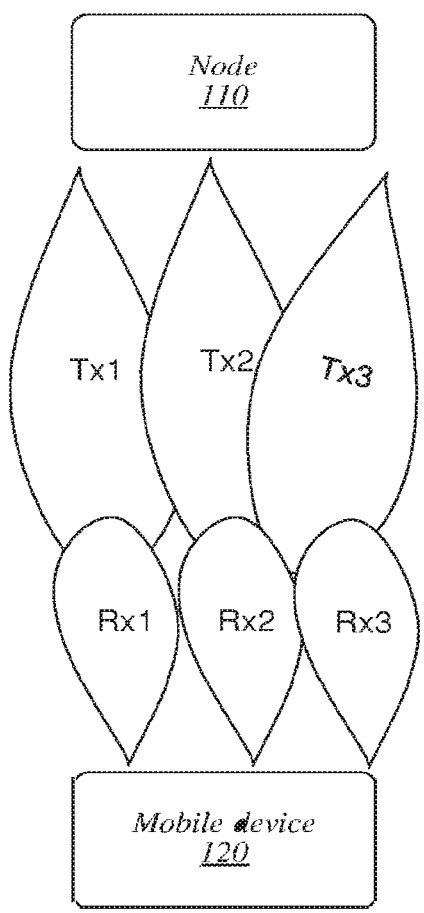
FIG. 2 illustrates an embodiment where beamforming is utilized between a node and a mobile station through array antennas in a communication system.

FIG. 2 illustrates an embodiment where beamforming is utilized between the node 110 and the mobile device 120, through an array antennas in the communication system 100. As illustrated, the node 110 can transmit data while changing the direction of a downlink transmission beam (Tx1, Tx2, or Tx3) by using a plurality of array antennas. The mobile device 120 can also receive data while changing the direction of a receive beam (Rx1, Rx2, or Rx3). The number of transmission beams and receive beams may be merely temporary.

In the communication system 100 using beamforming, each of the node 110 and the mobile device 120 transmits and receives data by selecting the direction of a Tx beam and the direction of a Rx beam. Each of the node 110 and the mobile device 120 may select an appropriate Tx/Rx beam pair from among various directions of Tx beams and various directions of Rx beams. Selection or beam switching of the appropriate Tx/Rx beam pair may be based on a determination of an optimal channel environment. Beam switching is applicable not only to a DL channel over which data is transmitted from the node 110 to the mobile device 120, but also to a UL channel over which data is transmitted from the mobile device 120 to the node 110.

Figure 3:
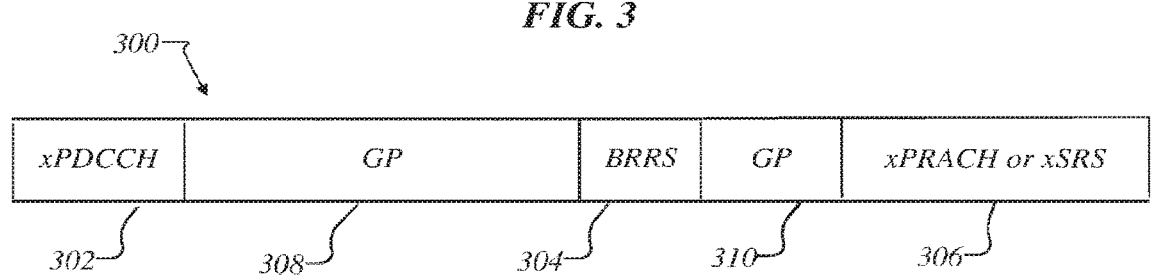
FIG. 3 illustrates a first example of a beam switching frame structure that provides both uplink (UL) and downlink (DL) beam switching and refinement in one subframe.

The UL beam switching and refinement may rely on the xPRACH or xSRS. The DL beam switching and refinement may be done based on the BRRS. Hence, in some embodiments, to accomplish the both UL and DL beam switching and refinement in one subframe, the BRRS and xPRACH or xSRS may be located in one subframe. FIG. 3 illustrates a first example of a beam switching frame structure 300 that provides both UL and DL beam switching and refinement in one subframe. In one embodiment, the frame structure 300 includes an xPDCCH section 302, a BRRS section 304, and an xPRACH or xSRS section 306. In a further embodiment, the frame structure 300 may further include a guard period (GP) section 308 and a GP section 310.

In one embodiment, the xPDCCH section 302 includes one or more xPDCCH symbols. For example, the xPDCCH section 302 may include two xPDCCH symbols. In one embodiment, the xPDCCH section 304 includes one or more BRRS symbols. For example, the BRRS section 304 may include two BRRS symbols. In one embodiment, xPRACH or xSRS section 306 includes one or more xPRACH or xSRS symbols. For example, the xPRACH or xSRS section 306 may include three xPRACH or xSRS symbols.

The frame structure 300 may be a subframe that includes two slots. A first of the two slots may include sections of 302 and 308. A second of the two slots may include sections 304, 306 and 310. In one embodiment, the one or more BRRS symbols in the BRRS section 304 are at the head or beginning of the second slot of the frame structure 300.

The UL Tx beam for xPRACH or xSRS may be the same as the refined DL Rx beam obtained after BRRS processing. In some embodiments, an eNB may assume that the same UL Tx beam as the DL Tx beam used for BRRS. In some embodiments, the sequence of xPRACH or xSRS may be transmitted repeatedly so that the eNB may scan multiple UL Rx beams. The GP section 308 may provide a time period for a UE to process the xPDCCH and activate Rx beam switching. The GP section 310 may provide a time period for a UE to process a BRRS and to switch the UE's transceiver chain from DL to UL. The GP section 310 may also provide a time period sufficient to allow the eNB to switch a transceiver chain from DL to UL, based on an amount of UE assigned to the frame structure 300. In one embodiment, an eNB provides DCI that indicates an xPRACH preamble index.

Figure 4:
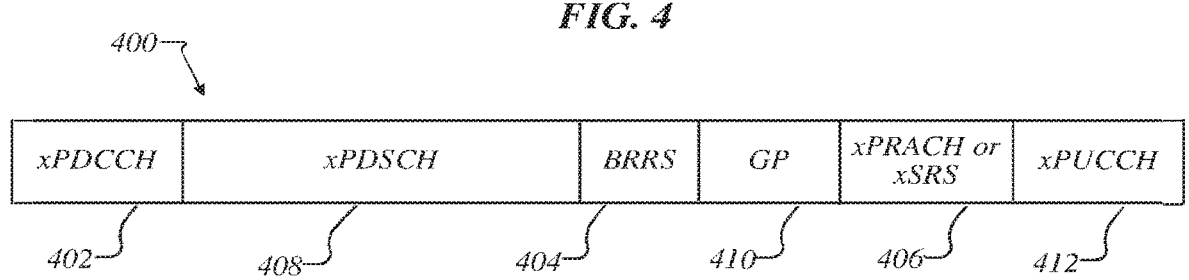
FIG. 4 illustrates a second example of a beam switching frame structure that provides for both UL and DL beam switching and refinement in one subframe.

FIG. 4 illustrates a second example of a beam switching frame structure 400 that provides for both UL and DL beam switching and refinement in one subframe. In one embodiment, the frame structure 400 includes an xPDCCH section 402, a BRRS section 404, and an xPRACH or xSRS section 406. In this example, the frame structure 400 further includes data samples in a section 408 (e.g., for extended (e.g., 5G) PDSCH (xPDSCH) or extended (e.g., 5G) PUSCH (xPUSCH)) following the xPDCCH section 402. The section 408 may include eight xPDSCH symbols.

The beam switching frame structure 400 may further include a GP section 410. The GP section 410 may provide a time period for a UE to process a BRRS and to switch the UE's transceiver chain from DL to UL. The GP section 410 may also provide a time period sufficient to allow the eNB to switch a transceiver chain from DL to UL, based on an amount of UE assigned to the frame structure 400. Furthermore, the beam switching frame structure 400 may include a 5G physical uplink control channel (xPUCCH) section 412. The xPUCCH section 412 may include one xPUCCH symbol. In one implementation, a hybrid automatic repeat request acknowledgment (HARQ-ACK) may be transmitted in the xPUCCH section 412.

In one embodiment, xPRACH or xSRS section 406 and the symbols therein may be used for UL timing advance (TA) estimation and power control. Furthermore, following BRRS detection and processing, a new DL Tx beam may be used for xPRACH/xSRS/xPUCCH. A new channel cluster may be tracked, and a new UL Tx power adjustment due to equivalent channel gain change and TA estimation may occur.

Figure 5:
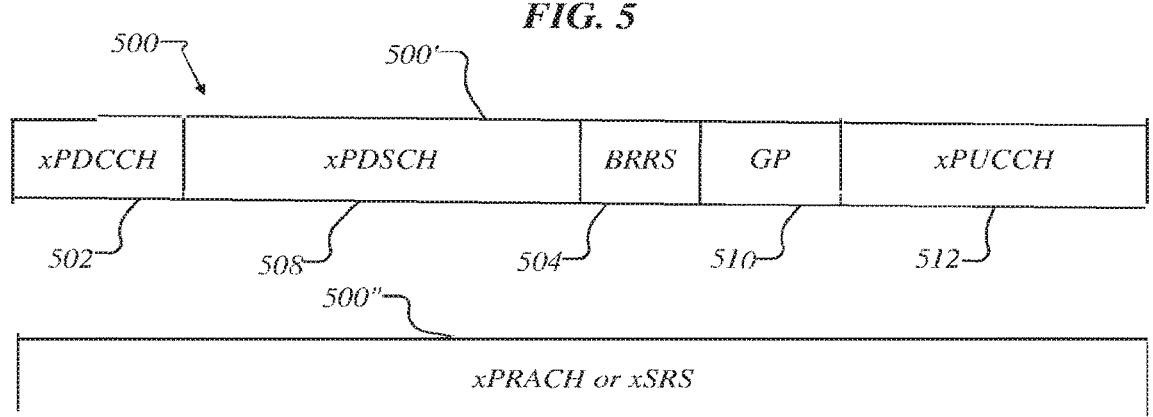
FIG. 5 illustrates a third example of a beam switching frame implementation that provides for both UL and DL beam switching and refinement in two subframes.

In another embodiment, DL and UL beam refinement may be performed by two separate subframes. FIG. 5 illustrates a third example of a beam switching frame implementation 500 that provides for both UL and DL beam switching and refinement in two subframes.

In one embodiment, the frame implementation 500 includes a first subframe 500' that comprises an xPDCCH section 502, a BRRS section 504, and an xPDSCH section 508 (e.g., for xPDSCH or xPUSCH) following the xPDCCH section 502. The section 508 may include eight xPDSCH symbols. Furthermore, first subframe 500' may include an xPUCCH section 512. The xPUCCH section 512 may include one xPUCCH symbol. In one implementation, a hybrid automatic repeat request acknowledgment (HARQ-ACK) may be transmitted in the xPUCCH section 512. Furthermore, the xPUCCH section 512 may contain at least one or two beam quality indicators (BQI). The first subframe 500' may further include a GP section 510. The GP section 510 may provide a time period for a UE to process a BRRS and to switch the UE's transceiver chain from DL to UL. The GP section 510 may also provide a time period sufficient to allow the eNB to switch a transceiver chain from DL to UL, based on an amount of UE assigned to the first subframe 500'. The first subframe 500' including the BRRS section 504 may be used to enable switching a DL Tx beam.

UL RX beam refining may occur subsequent to DL Tx beam switching and refinement. Therefore, a second subframe 500" may be provided after the first subframe 500' is provided. The second subframe 500" may include one or more xPRACH or xSRS symbols. The xPRACH or xSRS preamble index may be indicated in the DCI. The xPRACH or xSRS resource index may be also indicated by the DCI. A delay for xPRACH or xSRS transmission may be pre-defined by the communication system 100 or indicated by the DCI. If the Rx beam and Tx beam have not significantly changed, the xPRACH or xSRS may not be transmitted. The xPUCCH section 512 may report one flag for xPRACH or xSRS transmission of the second subframe 500". Specifically, the flag may indicate whether the UE will transmit the xPRACH or xSRS.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 6:
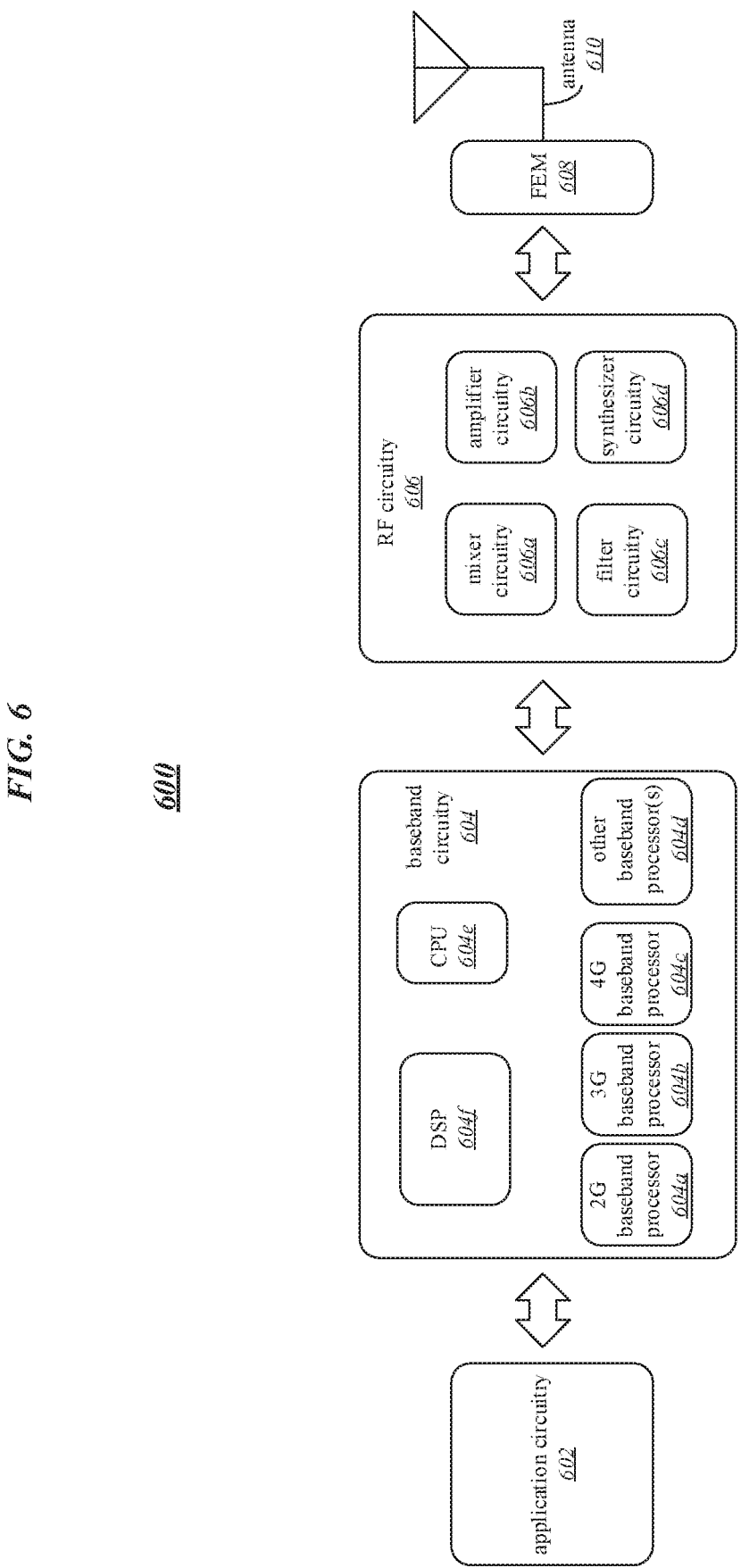
FIG. 6 illustrates example components of an electronic device.

FIG. 6 illustrates example components of an electronic device 600. In embodiments, the electronic device 600 may, implement, be incorporated into, or otherwise be a part of a user equipment (UE), an evolved NodeB (eNB), some other equipment capable of performing similar operations, or some combination thereof. In some embodiments, the UE device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission. In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602. Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FBM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

In some embodiments, the electronic device 600 may include additional elements such as, for example, memory/storage, display, camera, sensor, and/or input/output (I/O) interface.

In embodiments where the electronic device 100 is, implements, is incorporated into, or is otherwise part of a user equipment (UE), the RF circuitry 606 may be to receive a subframe or long term evolution (LTE) subframe that includes a BRRS. The baseband circuitry 604 may be to determine a value of the BRRS and switch a DL Tx beam based on the value of the BRRS. In embodiments where the electronic device 600 is, implements, is incorporated into, or is otherwise part of a eNodeB (eNB), RF circuitry 606 may be to receive a long term evolution (LTE) subframe that includes x(e.g, 5G)PRACH or x(e.g, 5G)SRS. The baseband circuitry 604 may be to determine a value of the xPRACH or the xSRS within the LTE subframe and refine UL Rx beam based on the value of the xPRACH or the xSRS.

Figure 7:
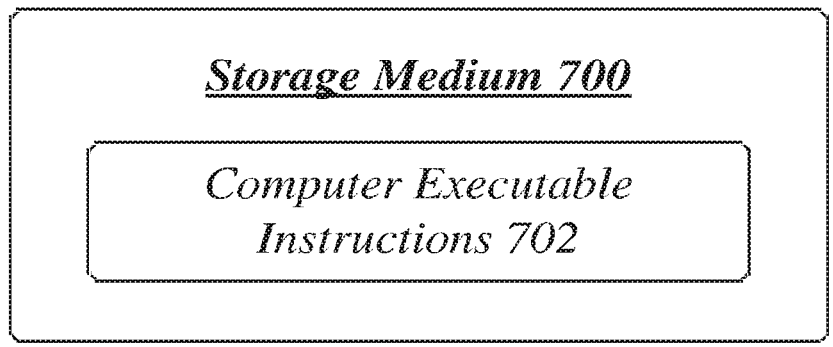
FIG. 7 illustrates an embodiment of a storage medium.

FIG. 7 illustrates an embodiment of a storage medium 700. The storage medium 1100 may comprise an article of manufacture. In one embodiment, the storage medium 700 may comprise any non-transitory computer readable medium or machine readable medium, such as an optical, magnetic or semiconductor storage. The storage medium may store various types of computer executable instructions, such as instructions 702 to implement one or more of logic flows described herein. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

In some embodiments, the electronic device of FIG. 6 may be configured to perform one or more processes, techniques, and/or methods as described herein, or portions thereof. One such process is depicted in FIG. 8. For example, the process may include, at 802, receiving or causing to receive a beam refinement reference signal (BRRS) subframe that includes at least one xPRACH symbol or at least one xSRS symbol. The process may further include, at 804, identifying or causing to identify the xPRACH symbol or the xSRS symbol within the BRRS subframe and, at 806, refining or causing to refine a UL Rx beam based on the at least one xPRACH symbol or the at least one xSRS symbol.

In some embodiments, the electronic device of FIG. 6 may be configured to perform one or more processes, techniques, and/or methods as described herein, or portions thereof. One such process is depicted in FIG. 9. For example, the process may include, at 902, receiving or causing to receive a BRRS subframe that includes at least one BRRS symbol. The process may further include, at 904, identifying or causing to identify the at least one BRRS symbol within the BRRS subframe and, at 906, switching or causing to switch a DL Tx beam based on the at least one BRRS symbol.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments. Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

What has been described above includes examples of the disclosed architecture, system, devices, processes, structure, and functions. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus, comprising: at least one memory; and logic, at least a portion of which is implemented in circuitry coupled to the at least one memory, the logic to: identify at least one 5G physical random access channel (xPRACH) symbol or at least one 5G sounding reference signal (xSRS) symbol in a beam refinement reference signal (BRRS) subframe; and refine an uplink (UL) receiving (Rx) beam based on the at least one xPRACH symbol or the at least one xSRS symbol.

Example 2

The apparatus according to Example 1, the BRRS subframe to include the at least one xPRACH symbol, and wherein the BRRS subframe is received a certain time period after transmission of another BRRS subframe that includes at least one BRRS symbol.

Example 3

The apparatus according to Example 2, the certain time period is pre-defined by a system or indicated by downlink control information (DCI).

Example 4

The apparatus according to any of Examples 1 to 3, an xPRACH preamble index associated with the BRRS subframe is indicated in downlink control information (DCI).

Example 5

The apparatus according to any of Examples 1 to 3, an xPRACH resource index associated with the BRRS subframe is indicated in downlink control information (DCI).

Example 6

The apparatus according to any of Examples 1 to 3, the BRRS subframe further includes at least one BRRS symbol.

Example 7

The apparatus according to Example 6, the at least one xPRACH symbol or the at least one xSRS symbol is located after the at least one BRRS symbol in the BRRS subframe.

Example 8

The apparatus according to Example 6, the BRRS subframe includes: a first guard period (GP) associated with a first period of time for processing of a 5G physical downlink control channel (xPDCCH) and activation of Rx beam switching; and a second GP associated with a second period of time for processing of a BRRS and time to switch a transceiver chain from downlink (DL) to UL.

Example 9

An apparatus, comprising: radio frequency (RF) circuitry to identify a received subframe that includes a 5G physical random access channel (xPRACH) or a 5G sounding reference signal (xSRS); baseband circuitry coupled to the RF circuitry, the baseband circuitry to: determine a value of the xPRACH or the xSRS within the received subframe; and refine an uplink (UL) receiving (Rx) beam based on the value of the xPRACH or the xSRS.

Example 10

The apparatus according to Example 9, the received subframe is a received long term evolution (LTE) subframe and the received LTE subframe includes the xPRACH, and wherein the received LTE subframe is received a certain time period after transmission of another LTE subframe that includes a beam refinement reference signal (BRRS).

Example 11

The apparatus according to Example 10, the certain time period is pre-defined by a communication system or indicated by downlink control information (DCI).

Example 12

The apparatus according to any of Examples 9 to 11, an xPRACH resource index associated with the subframe is indicated in downlink control information (DCI).

Example 13

The apparatus according to Example 9, the received subframe includes a beam refinement reference signal (BRRS).

Example 14

The apparatus according to Example 13, the xPRACH or the xSRS is located after the BRRS in the received subframe.

Example 15

The apparatus according to any of Examples 9 to 11, the received subframe includes: a first guard period (GP) associated with a first period of time for process of a 5G downlink control channel (xPDCCH) and activation of Rx beam switching; and a second GP associated with a second period of time for process of a beam refinement reference signal (BRRS) and time to switch a transceiver chain from downlink (DL) to UL.

Example 16

The apparatus according to any of Examples 9 to 11, the received subframe includes one 5G physical uplink control channel (xPUCCH) symbol.

Example 17

An apparatus, comprising: radio frequency (RF) circuitry to identify a received subframe that includes a beam refinement reference signal (BRRS); baseband circuitry coupled to the RF circuitry, the baseband circuitry to: determine a value of the BRRS; and switch a downlink (DL) transmitting (Tx) beam based on the value of the BRRS.

Example 18

The apparatus according to Example 17, the baseband circuitry is to refine a DL receiving (Rx) beam based on the value of the BRRS.

Example 19

The apparatus according to any of Examples 17 to 18, the received subframe further includes a 5G physical random access channel (xPRACH) or a 5G sounding reference signal (xSRS).

Example 20

The apparatus according to any of Examples 17 to 18, DL data is transmitted in the received subframe that includes the BRRS.

Example 21

The apparatus according to Example 20, the DL data in the received subframe precedes the BRRS.

Example 22

At least one non-transitory machine-readable storage medium comprising instructions that when executed by a computing device, cause the computing device to: identify at least one 5G physical random access channel (xPRACH) symbol or the at least one 5G sounding reference signal (xSRS) symbol within a beam refinement reference signal (BRRS) subframe; and refine an uplink UL receiving (Rx) beam based on the at least one xPRACH symbol or the at least one xSRS symbol.

Example 23

The least one non-transitory machine-readable storage medium of Example 22, the BRRS subframe includes the at least one xPRACH symbol, and wherein the BRRS subframe is received a certain time period after transmission of another BRRS subframe that includes at least one BRRS symbol.

Example 24

The least one non-transitory machine-readable storage medium according to any of Examples 22 to 23, the BRRS subframe further includes at least one BRRS symbol.

Example 25

The least one non-transitory machine-readable storage medium of Example 24, the at least one xPRACH symbol or the at least one xSRS symbol is located after the at least one BRRS symbol in the BRRS subframe.

Example 26

An apparatus, comprising:
at least one memory; and
logic, at least a portion of which is implemented in circuitry coupled to the at least one memory, the logic to: identify at least one 5G physical random access channel (xPRACH) symbol or at least one 5G sounding reference signal (xSRS) symbol in a beam refinement reference signal (BRRS) subframe; and refine an uplink (UL) receiving (Rx) beam based on the at least one xPRACH symbol or the at least one xSRS symbol.

Example 27

The apparatus according to Example 26, the BRRS subframe to include the at least one xPRACH symbol, and wherein the BRRS subframe is received a certain time period after transmission of another BRRS subframe that includes at least one BRRS symbol.

Example 28

The apparatus according to Example 27, the certain time period is pre-defined by a system or indicated by downlink control information (DCI).

Example 29

The apparatus according to Example 26, an xPRACH preamble index associated with the BRRS subframe is indicated in downlink control information (DCI).

Example 30

The apparatus according to Example 26, an xPRACH resource index associated with the BRRS subframe is indicated in downlink control information (DCI).

Example 31

The apparatus according to Example 26, the BRRS subframe further includes at least one BRRS symbol.

Example 32

The apparatus according to Example 31, the at least one xPRACH symbol or the at least one xSRS symbol is located after the at least one BRRS symbol in the BRRS subframe.

Example 33

The apparatus according to Example 31, the BRRS subframe includes: a first guard period (GP) associated with a first period of time for processing of a 5G physical downlink control channel (xPDCCH) and activation of Rx beam switching; and a second GP associated with a second period of time for processing of a BRRS and time to switch a transceiver chain from downlink (DL) to UL.

Example 34

An apparatus, comprising: radio frequency (RF) circuitry to identify a received subframe that includes a 5G physical random access channel (xPRACH) or a 5G sounding reference signal (xSRS); baseband circuitry coupled to the RF circuitry, the baseband circuitry to: determine a value of the xPRACH or the xSRS within the received subframe; and refine an uplink (UL) receiving (Rx) beam based on the value of the xPRACH or the xSRS.

Example 35

The apparatus according to Example 34, the received subframe is a received long term evolution (LTE) subframe and the received LTE subframe includes the xPRACH, and wherein the received LTE subframe is received a certain time period after transmission of another LTE subframe that includes a beam refinement reference signal (BRRS).

Example 36

The apparatus according to Example 35, the certain time period is pre-defined by a communication system or indicated by downlink control information (DCI).

Example 37

The apparatus according to Example 34, an xPRACH resource index associated with the subframe is indicated in downlink control information (DCI).

Example 38

The apparatus according to Example 34, the received subframe includes a beam refinement reference signal (BRRS).

Example 39

The apparatus according to Example 38, the xPRACH or the xSRS is located after the BRRS in the received subframe.

Example 40

The apparatus according to Example 34, the received subframe includes: a first guard period (GP) associated with a first period of time for process of a 5G downlink control channel (xPDCCH) and activation of Rx beam switching; and a second GP associated with a second period of time for process of a beam refinement reference signal (BRRS) and time to switch a transceiver chain from downlink (DL) to UL.

Example 41

The apparatus according to Example 34, the received subframe includes one 5G physical uplink control channel (xPUCCH) symbol.

Example 42

An apparatus, comprising: radio frequency (RF) circuitry to identify a received subframe that includes a beam refinement reference signal (BRRS); baseband circuitry coupled to the RF circuitry, the baseband circuitry to: determine a value of the BRRS; and switch a downlink (DL) transmitting (Tx) beam based on the value of the BRRS.

Example 43

The apparatus according to Example 42, the baseband circuitry is to refine a DL receiving (Rx) beam based on the value of the BRRS.

Example 44

The apparatus according to Example 42, the received subframe further includes a 5G physical random access channel (xPRACH) or a 5G sounding reference signal (xSRS).

Example 45

The apparatus according to Example 42, DL data is transmitted in the received subframe that includes the BRRS.

Example 46

The apparatus according to Example 45, the DL data in the received subframe precedes the BRRS.

Example 47

At least one non-transitory machine-readable storage medium comprising instructions that when executed by a computing device, cause the computing device to: identify at least one 5G physical random access channel (xPRACH) symbol or the at least one 5G sounding reference signal (xSRS) symbol within a beam refinement reference signal (BRRS) subframe; and refine an uplink UL receiving (Rx) beam based on the at least one xPRACH symbol or the at least one xSRS symbol.

Example 48

The least one non-transitory machine-readable storage medium of Example 47, the BRRS subframe includes the at least one xPRACH symbol, and wherein the BRRS subframe is received a certain time period after transmission of another BRRS subframe that includes at least one BRRS symbol.

Example 49

The least one non-transitory machine-readable storage medium according to Example 47, the BRRS subframe further includes at least one BRRS symbol.

Example 50

The least one non-transitory machine-readable storage medium of Example 48, the at least one xPRACH symbol or the at least one xSRS symbol is located after the at least one BRRS symbol in the BRRS subframe.

Example 51

An apparatus for uplink (UL) beam switching and refinement, comprising: means for receiving or causing to receive a beam refinement reference signal (BRRS) subframe that includes at least one fifth generation (5G) physical random access channel (xPRACH) symbol or at least one 5G sounding reference signal (xSRS) symbol; means for identifying or causing to identify the xPRACH symbol or the xSRS symbol within the BRRS subframe; and means for refining or causing to refine a UL receiving (Rx) beam based on the at least one xPRACH symbol or the at least one xSRS symbol.

Example 52

The apparatus according to Example 51, the BRRS subframe includes the at least one xPRACH symbol, and wherein the BRRS subframe is received a certain time period after transmission of another BRRS subframe that includes at least one BRRS symbol.

Example 53

The apparatus according to Example 52, the certain time period is predefined by a system or indicated by downlink control information (DCI).

Example 54

The apparatus according to Example 52, an xPRACH preamble index associated with the BRRS subframe is indicated in DCI.

Example 55

The apparatus according to Example 52, an xPRACH resource index associated with the BRRS subframe is indicated in DCI.

Example 56

The apparatus according to Example 51, the BRRS subframe further includes at least one BRRS symbol.

Example 57

The apparatus according to Example 56, the at least one xPRACH symbol or the at least one xSRS symbol is located after the at least one BRRS symbol in the BRRS subframe.

Example 58

The apparatus according to Example 56, the BRRS subframe includes: a first guard period (GP) associated with a first period of time for process of a 5G physical downlink control channel (xPDCCH) and activation of Rx beam switching; and a second GP associated with a second period of time for process of a BRRS and time to switch a transceiver chain from downlink (DL) to UL.

Example 59

The apparatus according to Example 58, the second GP is further associated with a third period of time for time to switch the transceiver chain from DL to UL based on an amount of user equipment assigned to the BRRS subframe.

Example 60

The apparatus according to Example 56, the BRRS subframe includes two xPDCCH symbols, two BRRS symbols and three xPRACH symbols or three xSRS symbols.

Example 61

The apparatus according to Example 56, DCI indicates an xPRACH preamble index.

Example 62

The apparatus according to Example 56, DL data is transmitted in the at least one BRRS symbol.

Example 63

The apparatus according to Example 62, the DL data is included within 8 symbols of the BRRS subframe.

Example 64

The apparatus according to Example 56, the BRRS subframe includes one 5G physical uplink control channel (xPUCCH) symbol.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific

What is claimed is:

1. An apparatus for a base station, comprising:
at least one memory; and
circuitry coupled to the at least one memory, the circuitry configured to:
identify at least one 5G physical random access channel (xPRACH) symbol or at least one 5G sounding reference signal (xSRS) symbol in a beam refinement reference signal (BRRS) subframe, wherein the BRRS subframe includes:
at least one BRRS symbol;
a first guard period (GP) associated with a first period of time for processing of a 5G physical downlink control channel (xPDCCH) and activation of receiving (Rx) beam switching; and
a second GP associated with a second period of time for processing of a BRRS and time to switch a transceiver chain from downlink (DL) to uplink (UL); and
refine an uplink (UL) receiving (Rx) beam based on the at least one xPRACH symbol or the at least one xSRS symbol.

2. The apparatus for the base station according to claim 1, wherein the second GP is between the xPRACH symbol or xSRS symbol and the at least one BRRS symbol.

3. The apparatus for the base station according to claim 1, wherein an xPRACH preamble index associated with the BRRS subframe is indicated in downlink control information (DCI).

4. The apparatus for the base station according to claim 1, wherein the at least one xPRACH symbol or the at least one xSRS symbol is located after the at least one BRRS symbol in the BRRS subframe.

5. The apparatus for the base station of according to claim 1, wherein the circuitry is configure to determine the UL Rx beam based on a downlink (DL) transmit (Tx) beam of the BRRS symbol.

6. An apparatus for a base station, comprising:
radio frequency (RF) circuitry configured to identify a subframe that includes:
a 5G physical random access channel (xPRACH) symbol or a 5G sounding reference signal (xSRS) symbol,
at least one beam refinement reference signal (BRRS) symbol,
a first guard period (GP) associated with a first period of time for processing of a 5G physical downlink control channel (xPDCCH) and activation of receiving (Rx) beam switching, and
a second GP associated with a second period of time for processing of a beam refinement reference signal (BRRS) and time to switch a transceiver chain from downlink (DL) to uplink (UL); and
baseband circuitry coupled to the RF circuitry, the baseband circuitry configured to:
determine a value of the xPRACH symbol or the xSRS symbol within the subframe, and
refine an uplink (UL) receiving (Rx) beam based on the value of the xPRACH symbol or the xSRS symbol.

7. The apparatus for the base station according to claim 6, wherein the second GP is after which the subframe includes the BRRS symbol.

8. The apparatus for the base station according to claim 6, wherein an xPRACH resource index associated with the subframe is indicated in downlink control information (DCI).

9. The apparatus for the base station according to claim 6, wherein the xPRACH symbol or the xSRS symbol is located after the BRRS symbol in the subframe.

10. The apparatus for the base station according to claim 6, wherein the subframe further includes one 5G physical downlink control channel (xPDCCH) symbol.

11. The apparatus for the base station of according to claim 6, wherein the baseband circuitry is configure to determine the UL Rx beam based on a downlink (DL) transmit (Tx) beam of the BRRS symbol.

12. An apparatus for a user equipment (UE) device, comprising:
radio frequency (RF) circuitry configured to identify a subframe that includes:
a beam refinement reference signal (BRRS) symbol,
a 5G physical random access channel (xPRACH) symbol or a 5G sounding reference signal (xSRS) symbol,
a first guard period (GP) associated with a first period of time for process of a 5G physical downlink control channel (xPDCCH) and activation of receiving (Rx) beam switching, and
a second GP associated with a second period of time for processing of a beam refinement reference signal (BRRS) and time to switch a transceiver chain from downlink (DL) to uplink (UL); and
baseband circuitry coupled to the RF circuitry, the baseband circuitry configured to:
determine a value of the BRRS symbol, and
switch an uplink (UL) transmitting (Tx) beam based on the value of the BRRS symbol.

13. The apparatus for the UE device according to claim 12, wherein the baseband circuitry is further configured to refine a DL receiving (Rx) beam based on the value of the BRRS symbol.

14. The apparatus for the UE device according to claim 12, wherein DL data is received in the subframe that includes the BRRS symbol.

15. The apparatus for the UE device according to claim 12, wherein the baseband circuitry is configured to:
determine the UL Tx beam based on a downlink (DL) receive (Rx) beam of the BRRS symbol; and
transmit the xPRACH symbol or the xSRS symbol using the UL Tx beam.

16. An apparatus for a user equipment (UE) device, comprising:
at least one memory; and
circuitry coupled to the at least one memory, the circuitry configured to:
identify a subframe that includes:
a beam refinement reference signal (BRRS) symbol,
a 5G physical random access channel (xPRACH) symbol or a 5G sounding reference signal (xSRS) symbol,
a first guard period (GP) associated with a first period of time for processing of a 5G physical downlink control channel (xPDCCH) and activation of receiving (Rx) beam switching, and
a second GP associated with a second period of time for processing of a BRRS and time to switch a transceiver chain from downlink (DL) to uplink (UL); and refine a downlink (DL) receiving (Rx) beam based on the value of the BRRS symbol.

17. The apparatus for the UE device according to claim 16, wherein the second GP is between the xPRACH symbol or xSRS symbol and the BRRS symbol.

18. The apparatus for the UE device according to claim 16, wherein an xPRACH preamble index associated with the subframe is indicated in downlink control information (DCI).

19. The apparatus for the UE device according to claim 16, wherein an xPRACH resource index associated with the subframe is indicated in downlink control information (DCI).

20. The apparatus for the UE device according to claim 16, wherein the xPRACH symbol or the xSRS symbol is located after the BRRS symbol in the subframe.

21. The apparatus for the UE device according to claim 16, wherein the circuitry is configured to:
   determine an uplink (UL) transmitting (Tx) beam based on the refined DL Rx beam; and
   transmit the xPRACH symbol or the xSRS symbol using the UL Tx beam.

\* \* \* \* \*